(12) United States Patent
Andreeva et al.

(10) Patent No.: US 7,739,699 B2
(45) Date of Patent: Jun. 15, 2010

(54) AUTOMATED CREATION/DELETION OF MESSAGING RESOURCES DURING DEPLOYMENT/UN-DEPLOYMENT OF PROXIES FOR THE MESSAGING RESOURCES

(75) Inventors: Rositza Andreeva, Sofia (BG); Stoyan M. Vellev, Sofia (BG); Michael Koegel, Roemerberg (DE)

(73) Assignee: SAP AG, Walldorf (DE)

( * ) Notice: Subject to any disclaimer, the term of this patent is extended or adjusted under 35 U.S.C. 154(b) by 1027 days.

(21) Appl. No.: 11/323,796

(22) Filed: Dec. 29, 2005

(65) Prior Publication Data
US 2007/0156823 A1 Jul. 5, 2007

(51) Int. Cl.
*G06F 13/00* (2006.01)
(52) U.S. Cl. ................... 719/330; 719/313; 719/315
(58) Field of Classification Search ............ 719/330, 719/313, 315
See application file for complete search history.

(56) References Cited

U.S. PATENT DOCUMENTS

| 6,877,163 | B1 * | 4/2005 | Jones et al. ............. 719/332 |
| 7,003,556 | B2 | 2/2006 | Ooe et al. |
| 7,356,562 | B2 * | 4/2008 | Yoon ............. 709/203 |
| 7,460,874 | B1 | 12/2008 | Hou et al. |
| 2003/0037069 | A1 | 2/2003 | Davison |
| 2003/0056073 | A1 | 3/2003 | Zeiger |
| 2003/0105800 | A1 | 6/2003 | Cullen |
| 2004/0202165 | A1 | 10/2004 | Aoki et al. |
| 2005/0240667 | A1 | 10/2005 | Koegel |
| 2005/0246186 | A1 | 11/2005 | Nikolov |
| 2005/0256931 | A1 | 11/2005 | Follmeg et al. |
| 2005/0262205 | A1 | 11/2005 | Nikolov et al. |
| 2005/0262215 | A1 | 11/2005 | Kirov et al. |
| 2005/0283517 | A1 * | 12/2005 | Meduri et al. ............ 709/200 |
| 2006/0010125 | A1 | 1/2006 | Beartusk et al. |
| 2006/0206905 | A1 * | 9/2006 | Werner ............. 719/330 |
| 2007/0153767 | A1 | 7/2007 | Nikolav et al. |
| 2007/0156833 | A1 | 7/2007 | Nikolov et al. |

OTHER PUBLICATIONS

Non-Final Office Action for U.S. Appl. No. 11/322,434 Mailed Dec. 8, 2008, 18 pages.
Non-Final Office Action for U.S. Appl. No. 11/322,441 Mailed Dec. 9, 2008, 15 pages.
"U.S. Appl. No. 11/322,434 , Final Office Action mailed Jun. 4, 2009", 13 pgs.
"U.S. Appl. No. 11/322,434, Advisory Action mailed Jul. 24, 2009", 3 pgs.
"U.S. Appl. No. 11/322,434, Non-Final Office Action mailed Dec. 8, 2008", 14 pgs.
"U.S. Appl. No. 11/322,434, Response filed Mar. 9, 2009 to Non Final Office Action mailed Dec. 8, 2008", 12 pgs.
"U.S. Appl. No. 11/322,434, Response filed Jul. 15, 2009 to Final Office Action mailed Jun. 4, 2009", 12 pgs.

(Continued)

*Primary Examiner*—Andy Ho
(74) *Attorney, Agent, or Firm*—Schwegman, Lundberg & Woessner, P.A.

(57) ABSTRACT

A method is described that automatically invokes in software a method call to a messaging service in response to an awareness that a proxy for a messaging service resource is needed. The method call requests the messaging service to create the messaging service resource.

20 Claims, 8 Drawing Sheets

OTHER PUBLICATIONS

"U.S. Appl. No. 11/322,441, Final Office Action mailed Aug. 6, 2009", 13 pgs.

"U.S. Appl. No. 11/322,441, Non Final Office Action mailed Dec. 9, 2008", 11 pgs.

"U.S. Appl. No. 11/322,441, Response filed Apr. 8, 2009 to Non Final Office Action mailed Mar. 24, 2009", 14 pgs.

"U.S. Appl. No. 11/322,434, Non-Final Office Action mailed Sep. 2, 2009", 13 pgs.

"U.S. Appl. No. 11/322,434, Response filed Nov. 18, 2009 to Non Final Office Action mailed Sep. 2, 2009", 13 pgs.

"U.S. Appl. No. 11/322,441, Response filed Mar. 12, 2009 to Non Final Office Action mailed Dec. 9, 2008", 14 pgs.

"U.S. Appl. No. 11/322,441, Response filed Nov. 25, 2009 to Final Office Action mailed Aug. 6, 2009", 14 pgs.

"U.S. Appl. No. 11/322,434, Non-Final Office Action mailed Mar. 23, 2010", 12 pgs.

* cited by examiner

AUTOMATED CREATION/DELETION OF MESSAGING RESOURCES DURING DEPLOYMENT/UN-DEPLOYMENT OF PROXIES FOR THE MESSAGING RESOURCES

FIELD OF INVENTION

The field of invention pertains to the software arts, and, more specifically, to the automated creation/deletion of messaging resources during deployment/un-deployment of proxies for the messaging resources

BACKGROUND

Component based software environments use granules of software (referred to as "components" or "component instances") to perform basic functions. The functional granularity offered by a plurality of different components provides a platform for developing a multitude of more comprehensive tasks. Some examples of component based architectures include Java 2 Enterprise Edition (J2EE), Common Object Request Broker Architecture (CORBA), Component Object Model (COM) and Distributed Component Object Model (DCOM) among others.

A container is a type of software platform that largely defines the operating environment of the software components that it "contains". The platform or operating environment defined by a container is usually at least partially defined by a set of "services". For example, in the case of a J2EE container, the layer of services offered by the J2EE container include a Java Naming and Directory Interface (JNDI) service, Java Database Connectivity (JDBC) service and a Java Messaging Service (JMS) among others.

Figure 1:
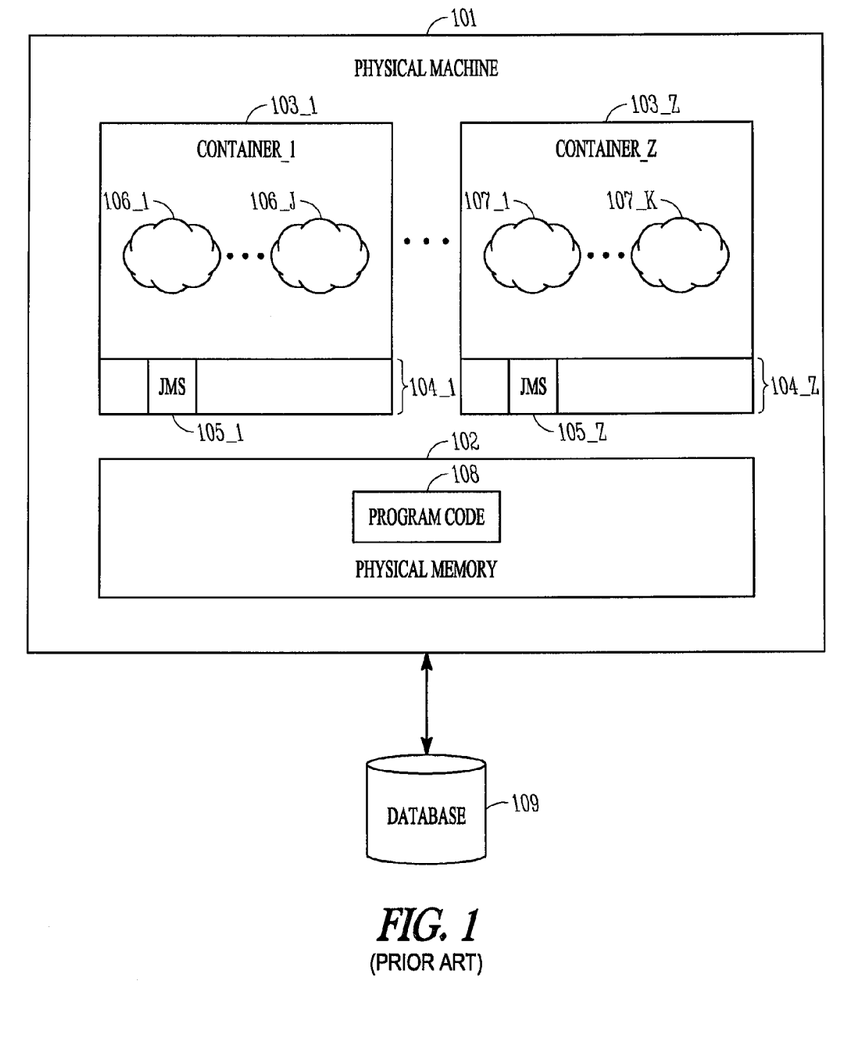
FIG. 1 (prior art) shows containers with messaging services instantiated within a physical machine.

FIG. 1 shows an exemplary implementation of a physical machine 101 (e.g., a computer) having a plurality of containers 103_1 through 103_Z. Each container 103_1 through 103_Z is depicted as containing its own respective application software programs 106_1 through 106_J and 107_1 through 107_K that, in the case of a component based environment are each constructed from their own respective component instance(s).

For example, in the case of J2EE EJB containers, application programs are made of one or more Enterprise Java Bean (EJB) component instances, or, in the case of J2EE web containers, application programs are made of one or more Java servlet component instances and/or Java Server Pages (JSPs) (for Web containers). A Java servlet is used to support the invocation of functional task(s) called from a web page (such as a JSP) that has been downloaded to a client computer. A web page is a text document typically written in a markup language (such as HTML or XML).

Each container 103_1 through 103_Z is depicted as having its own associated layer of services 104_1 through 104_Z. A messaging service 105_1 through 105_Z is depicted as being associated with each container's respective layer of services 104_1 through 104_Z. In component based architectures, a messaging service is a body of software ("program code") that is responsible for the delivery of a message to the component to which the message has been sent. As such, messaging service 105_1 is responsible for the delivery of messages to applications 106_1 through 106_J, and, messaging service 105_Z is responsible for the delivery of messages to applications 107_1 through 107_K.

The applications observed in FIG. 1 may receive messages, for instance, as a consequence of component-to-component messaging (e.g., a first component invokes a method performed by a second component), or, web page to component messaging. In the case of J2EE, the messaging services 104_1 through 104_Z correspond to instances of the Java Messaging Service (JMS). Note that each messaging service 105_1 through 105_Z may be different instances of the same program code. Each messaging service instance may also support the sending of messages from the applications of its respective container to destinations residing outside its respective container.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 2:
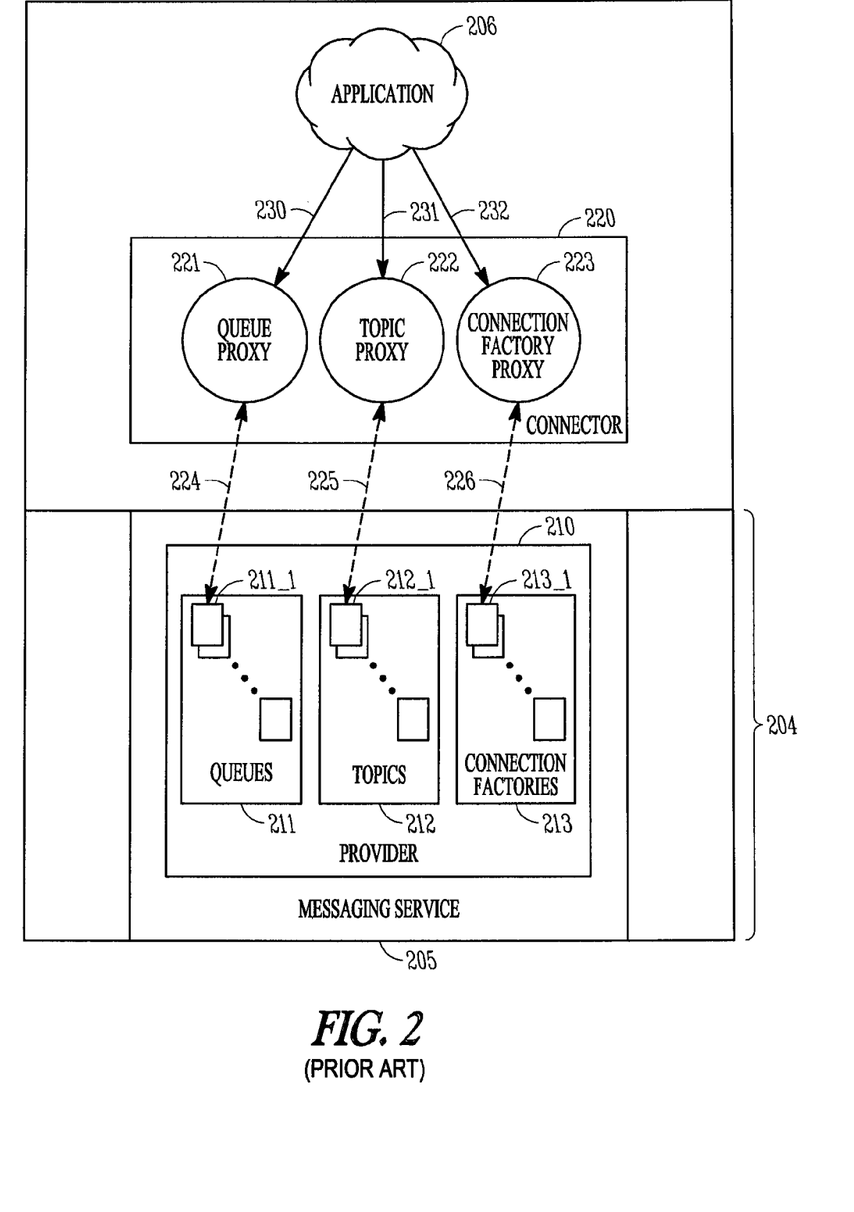
FIG. 2 (prior art) shows a messaging service container with associated proxies for specific messaging service resources that are provided by the messaging service.

FIG. 2 shows a messaging service container 203 with associated proxies 221, 222, 223 for specific messaging service resources 211_1, 212_1, 212_3. Each of proxies 221, 222, 223 are used to translate method calls invoked by an application or software component 206 that desires to use the resources 221, 222, 223. For instance, if resource 211_1 corresponds to a queue and application 206 desires to place a message into the queue 211_1 (or receive a message from the queue 211_1), the application 206 invokes a method 230 at the proxy 221 to the queue 211_1 rather than invoking a method to the messaging service directly 205. For simplicity an application or component ("application") will be referred to simply as an application. Therefore the term application is meant to refer to a plurality of software components organized into a comprehensive application as well as a singular software component (e.g., a single EJB or servlet). In an object oriented environment, a software component is constructed from one or more objects.

A reason for using a proxy in this manner, for instance, is in a situation where the messaging service 205 has a proprietary architecture with its own unique interface to the resource 211_1 that the application 206 does not understand or comprehend. A typical case may be an implementation where the application 206 only comprehends method calls to the resource 211_1 that are formatted according to an industry standardized definition which is different than the interface offered by the messaging service. In order to use the resource 211_1, the application makes method calls 230 to the resource's proxy 211_1 in the format of the industry standard, and, the proxy converts these method calls into the specific format understood by the messaging service 205.

According to the depiction of FIG. 2, three different resources 211_1, 212_1, 212_3 are capable of being used by the application 206. In at least a Java environment where the container 203 corresponds to a J2EE container and messaging service instance 205 corresponds to a Java Messaging Service (JMS) instance, one of these resources 211_1 may correspond to a queue, another of these resources 212_1 may correspond to a topic, and a third of these resources 213_1 may correspond to a connection factory.

A queue is resource into which (and/or from which) items (such as a message) are placed (and/or taken from). A queue is meant for point-to-point communication, i.e. one message producer ("sender") and one message consumer ("receiver"). A topic is also a resource into which (and/or from which) items (such as a message) are placed (and/or taken from). A topic is meant for publish-subscribe communication, i.e. one message producer ("publisher") and many message consumers ("subscribers"). A connection factory resource is a resource from which connection resources are created. A connection is a resource representing the connection between the messaging client and the messaging server. In particular, it may be used to create session resources. A session is a resource representing a sequence of interactions that logically belong to one session between the messaging client and messaging server. The relation between these resources is the following: a connection factory is used to create connections, a connection is used to create sessions, and a session is used to create queues, topics, message producers and message consumers. The messaging service's provider 210 is the component of the messaging service that contains the messaging service's different resources that may be accessed by applications either directly through the interface (e.g., by those applications that comprehend the messaging service's proprietary interface(s)) or indirectly through proxies (e.g., by those applications that do not comprehend the messaging service's proprietary interfaces). As depicted in FIG. 2, the messaging service's various resources include a plurality of different queue instances 211, a plurality of different topic instances 212 and a plurality of different connection factory instances.

A problem that currently exists is an inefficiency associated with the manner in which resources are created/destroyed when their corresponding proxies are deployed/un-deployed. Deployment is the act of loading software into a physical machine and/or container. A deployment descriptor is a body of information (e.g., a text document such as an XML document) that defines the configuration of a software application being deployed. During the deployment of a particular application, the deployment descriptor that was created for the application is referred to in order to properly configure the application before it is actually used.

One type of configuration parameter that may be defined in a deployment descriptor is the specific types of messaging resource proxies that the need to be created for the application. For instance, if the application is written so that it uses a particular queue resource (e.g., queue resource 211_1), a particular topic resource (e.g., topic resource 212_1) and a particular connection factory resource (e.g., connection factory resource 213_1), the application's deployment descriptor will indicate that a queue resource proxy, a topic resource proxy and a connection factory resource need to be created for the application. During the deployment process, the deployment descriptor is referred to and instances of the appropriate proxies 221, 222, 223 are created for the application being deployed.

According to one approach, the proxies 221, 222, 223 may be part of a connector object (or component) 220 that is created for the application being deployed. The connector object 220 serves as the primary object that the application being deployed will invoke method calls to when it uses the messaging service 205. Although one connector per deployed application is possible as described just above, it also possible that certain deployed environments will create a connector object that services a plurality of deployed applications.

Depending on architecture, the creation of a proxy for a resource may also necessitate the creation of the messaging resource that the proxy accepts method calls for. For instance, if each application is given its own "private" set of messaging service resources (e.g., its own queue, its own topic and/or its own connection factory), then, associated with the creation of a proxy for a resource is the creation of the resource itself. Unfortunately, in such situations, there currently does not exist an automated synchronization between the creation of a proxy and the creation of a messaging resource.

That is, if an application is being deployed and its deployment descriptor specifies that a certain type of messaging resource proxy is to be created, the proxy will be created but the messaging resource within the messaging resource that the proxy accepts method calls on behalf of will not be created unless a separate configuration process is undertaken. Here, the deployment descriptor of an application and the configuration methods that stem from it do not have any "visibility" into the messaging service so as to create the necessary resources. Therefore, in many cases, the messaging service has to be configured manually so as to create the messaging resource.

Figure 3:
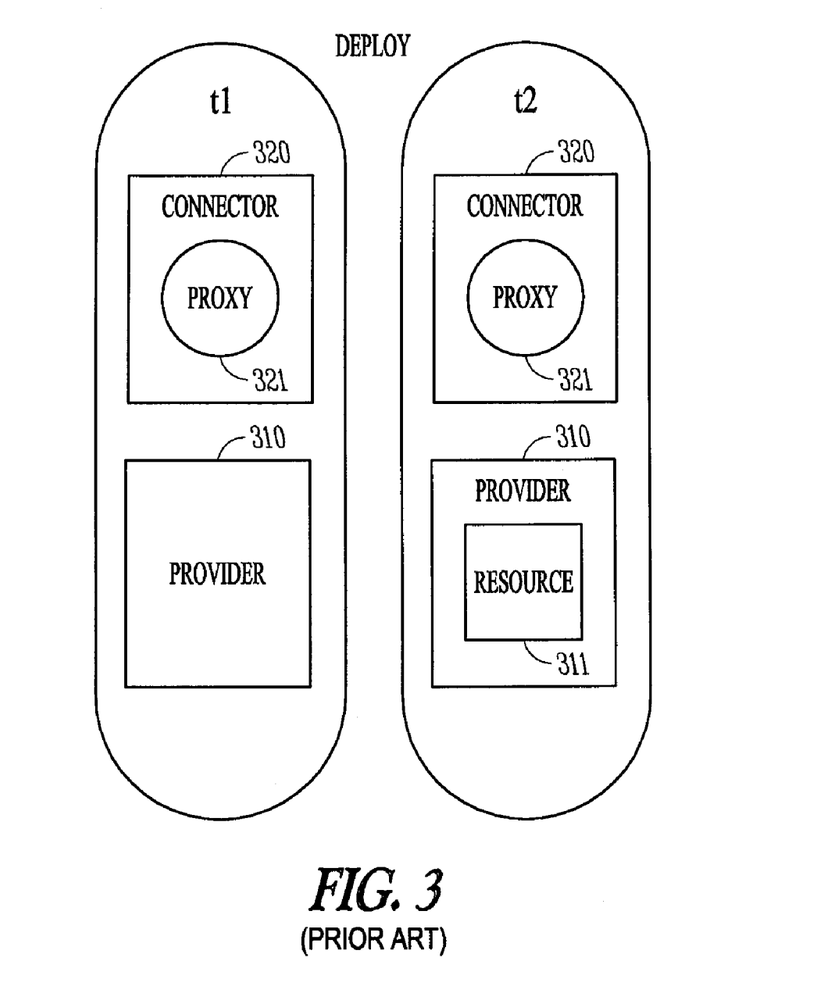
FIG. 3 (prior art) shows a messaging resource proxy deployment process.
Figure 4:
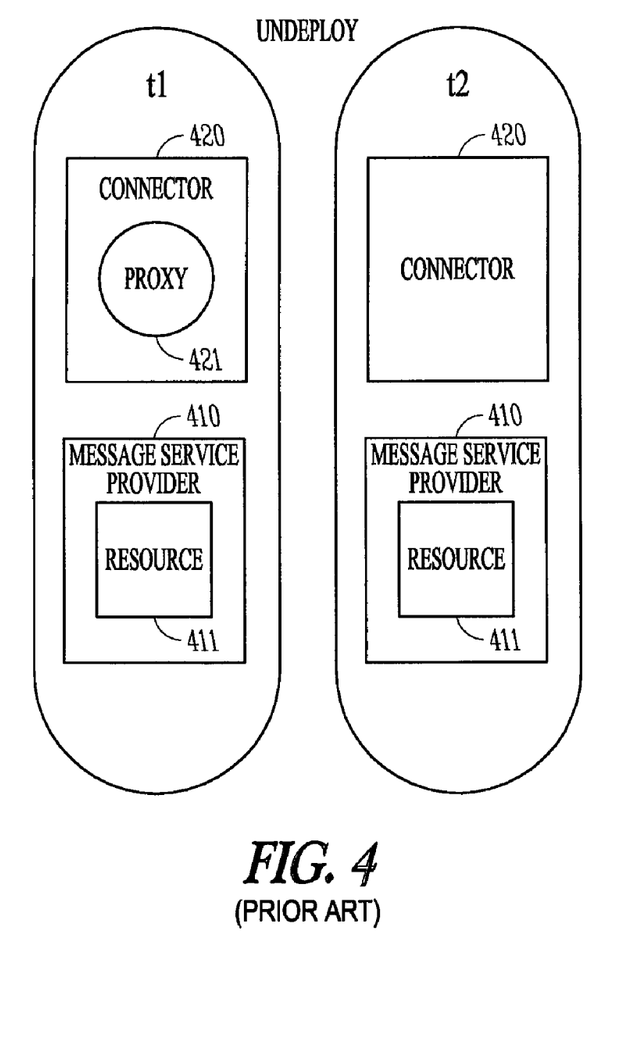
FIG. 4 (prior art) shows a messaging resource proxy un-deployment process.

FIGS. 3 and 4 elaborate on the problem in more detail. FIG. 3 shows a deployment process in sequence where time t2 occurs after time t1. After the proxy 321 for a messaging resource has been created within the connector 320, the messaging service resource that the proxy 321 accepts method calls for does not exist within the messaging service's provider 310. That is, there exists no automated synchronization between the creation of the proxy 321 and the creation of the resource. As such, the creation of the resource 311 has to be caused through manual efforts. The result is that the resource 311 is created within the provider 311 at a later time T2.

FIG. 4 shows a un-deployment process. Un-deployment is the removal or disabling of an application from a container and/or physical machine. In the case of un-deployment, an application's own private proxy 421 will be destroyed/disabled as observed from time t1 to time t2 (note the connector 420 may be destroyed/disabled as well). However, again because there is no automated synchronization between the presence of a proxy and the presence of its corresponding messaging service resource, the proxy's resource 411 remains within the messaging service provider 410 long after the proxy has been destroyed (i.e., the proxy is destroyed but the resource is not). In order to remove the resource 411 a separate, manually initiated process has to be performed.

Figure 5:
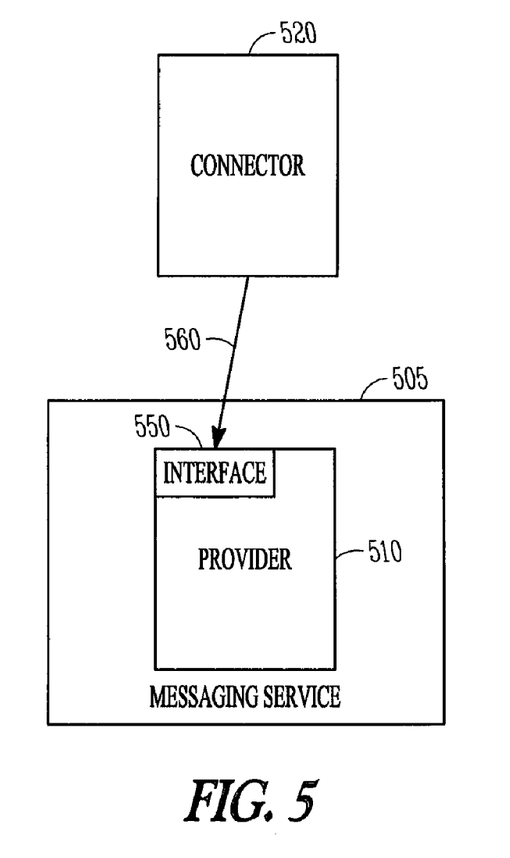
FIG. 5 shows an improved messaging service having an interface for automatically creating/deleting a messaging service resource during deployment/un-deployment of a proxy for the messaging service resource.

FIG. 5 shows an improved approach in which an interface 550 is added to the resource provider 550 of messaging service 505. The interface 550 accepts method calls from the connector 520 for the: 1) creating of a resource instance in the case of an application's deployment and corresponding creation of a proxy for the resource; and, 2) removing or disabling ("deactivating") of a messaging service resource in the case of an application's deactivation and corresponding deactivation of the proxy for the resource.

For instance, according to one approach, the connector 520 executes one or more methods that automatically call 560 upon interface 550 when a new proxy is created within the connector (e.g., as a consequence of an application being deployed). The call 560 upon the interface 550 causes the provider 510 to generate the proxy's resource within the connector 520. Also, the connector 520 executes one or more methods that automatically call 560 upon interface 550 when an existing proxy is deactivated within the connector (e.g., as an application being un-deployed). The call 560 upon the interface 550 causes the provider to deactivate the proxy's resource within the connector 520.

The method calls made by the connector 520 should identify the proxy and/or resource at issue as well as whether resource creation or resource deactivation is desired. Also, the interface 550 that is called upon by the connector 520 may conceivably be associated with a different part of the messaging service. That is, the messaging service receives the method calls and has to internally address its own provider in response (rather than having the connector address the provider directly).

Figure 6:
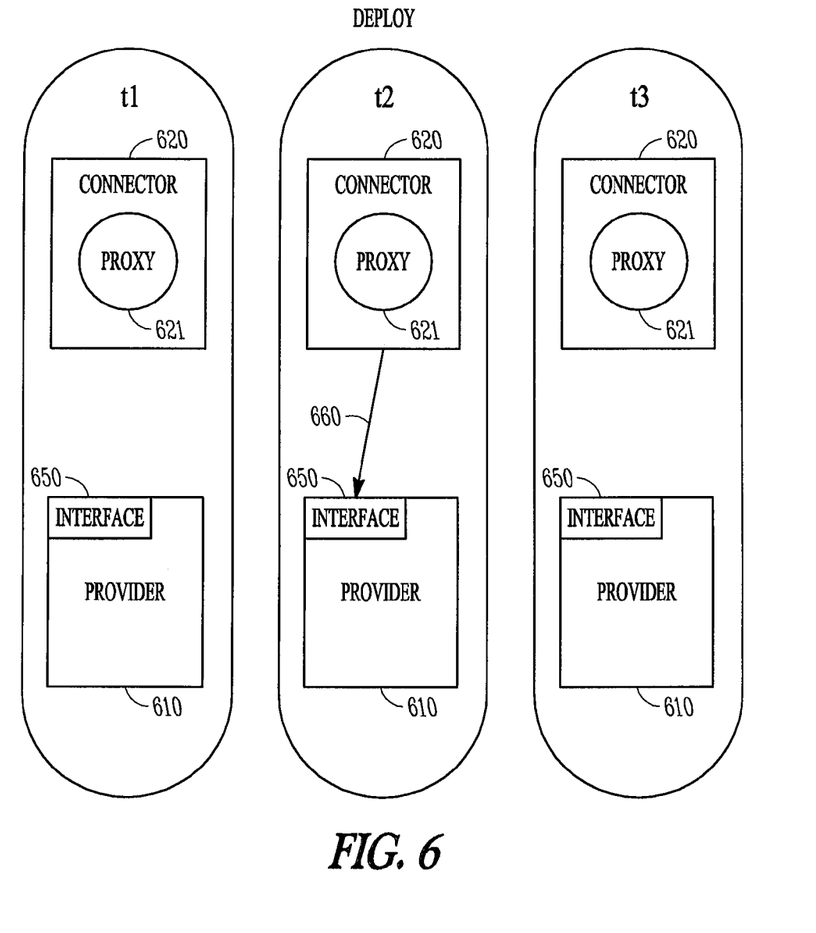
FIG. 6 shows the automatic creation of a messaging service resource during the deployment of a proxy for the messaging service resource.
Figure 7:
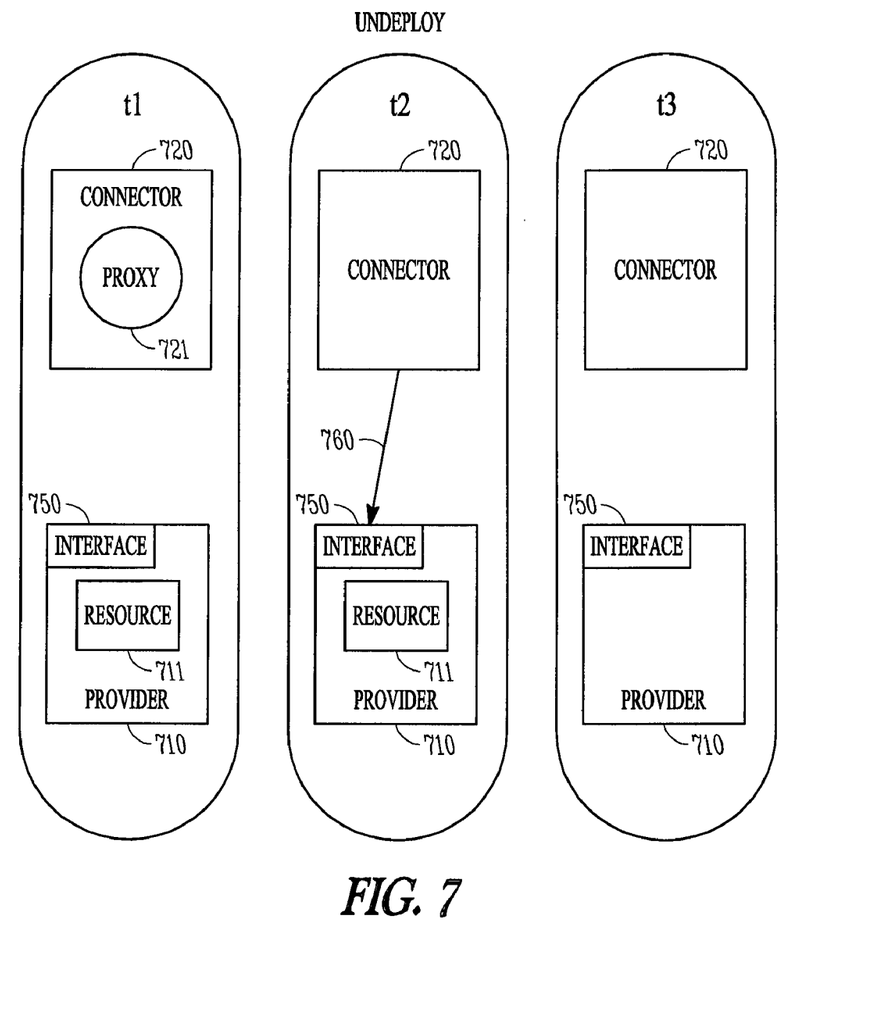
FIG. 7 shows the automatic deletion of a messaging service resource during the un-deployment of a proxy for the messaging service resource.

FIGS. 6 and 7 provide diagrams that pertain to the approach of FIG. 5 and that are directly comparable to diagrams 3 and 4, respectively. Specifically, FIG. 6 pertains to an application deployment process and FIG. 7 pertains to an application un-deployment process.

Referring to FIG. 6, at time t1, a proxy 621 for an as yet non existent messaging service resource is created within a connector 620. In response to the creation of the proxy 621, the connector 620 invokes a method call 660 to the provider 610 interface 650 at time t2 that requests the creation of the resource that the proxy 621 acts on behalf of. In response to the method call 660, the provider 610 creates the requested resource 611 at time t3. In alternate implementations the method call 660 could be made commensurate with or even before the creation of the proxy 621. That is, once the connector 620 knows that the proxy needs to be created, it is free to invoke the method call 660.

Referring to FIG. 7, at time t1, the resource 711 exists within the provider 710 and its corresponding proxy 721 exists within a connector 720. In response to the deactivation of the proxy 721, the connector 720 invokes a method call 760 to the provider 710 interface 750 at time t2 that requests the deactivation of the resource 711. In response to the method call 760, the provider 710 deactivates the resource 711 at time t3. In alternate implementations the method call 760 could be made commensurate with or even before the deactivation of the proxy 721. That is, once the connector 720 knows that the proxy needs to be deactivated, it is free to invoke the method call 760.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.).

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 8:
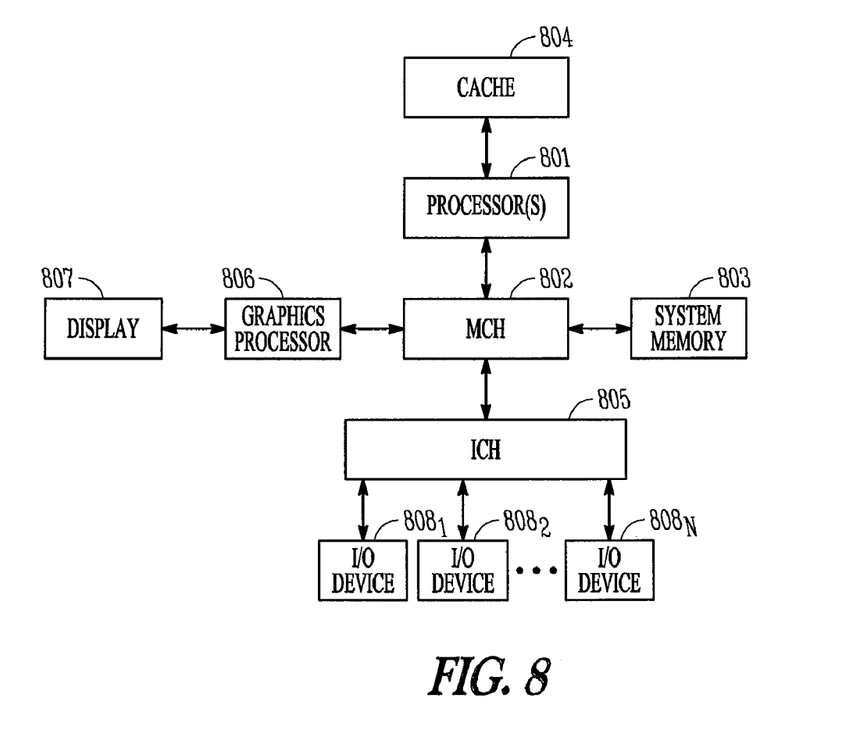
FIG. 8 shows a depiction of a computing system.

FIG. 8 shows an embodiment of a computing system (e.g., a computer). The exemplary computing system of FIG. 8 includes: 1) one or more processors 801; 2) a memory control hub (MCH) 802; 3) a system memory 803 (of which different types exist such as DDR RAM, EDO RAM, etc.); 4) a cache 804; 5) an I/O control hub (ICH) 805; 6) a graphics processor 806; 7) a display/screen 807 (of which different types exist such as Cathode Ray Tube (CRT), Thin Film Transistor (TFT), Liquid Crystal Display (LCD), DPL, etc.; 8) one or more I/O devices 808.

The one or more processors 801 execute instructions in order to perform whatever software routines the computing system implements. The instructions frequently involve some sort of operation performed upon data. Both data and instructions are stored in system memory 803 and cache 804. Cache 804 is typically designed to have shorter latency times than system memory 803. For example, cache 804 might be integrated onto the same silicon chip(s) as the processor(s) and/or constructed with faster SRAM cells whilst system memory 803 might be constructed with slower DRAM cells.

By tending to store more frequently used instructions and data in the cache 804 as opposed to the system memory 803, the overall performance efficiency of the computing system improves.

System memory 803 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 803 prior to their being operated upon by the one or more processor(s) 801 in the implementation of a software program. Similarly, data that a software program determines should be sent from the computing system to an outside entity through one of the computing system interfaces, or stored into an internal storage element, is often temporarily queued in system memory 803 prior to its being transmitted or stored.

The ICH 805 is responsible for ensuring that such data is properly passed between the system memory 803 and its appropriate corresponding computing system interface (and internal storage device if the computing system is so designed). The MCH 802 is responsible for managing the various contending requests for system memory 803 access amongst the processor(s) 801, interfaces and internal storage elements that may proximately arise in time with respect to one another.

One or more I/O devices 808 are also implemented in a typical computing system. I/O devices generally are responsible for transferring data to and/or from the computing system (e.g., a networking adapter); or, for large scale non-volatile storage within the computing system (e.g., hard disk drive). ICH 805 has bi-directional point-to-point links between itself and the observed I/O devices 808.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
using at least one processor, automatically invoking in software a method call to a messaging service in response to an awareness that a proxy for a messaging service resource is needed, said method call requesting said messaging service to create said messaging service resource.

2. The method of claim 1 wherein said resource is a queue.

3. The method of claim 1 wherein said resource is a topic.

4. The method of claim 1 wherein said resource is a connection factory.

5. The method of claim 1 wherein said messaging service is a Java messaging service within a container.

6. The method of claim 1 wherein said awareness arises from a deployment of an application that is to use said proxy and said resource.

7. The method of claim 1 further comprising automatically invoking in software a second method call to said messaging service in response to an awareness that said proxy needs to be deactivated, said second method call requesting said service to deactivate said messaging service resource.

8. An article of manufacture including program code which, when executed by a machine, causes the machine to perform a method, the method comprising:
automatically invoking in software a method call to a messaging service in response to an awareness that a proxy for a messaging service resource is needed, said method call requesting said messaging service to create said messaging service resource.

9. The article of manufacture of claim 8 wherein said resource is a queue.

10. The article of manufacture of claim 8 wherein said resource is a topic.

11. The article of manufacture of claim 8 wherein said resource is a connection factory.

12. The article of manufacture of claim 8 wherein said messaging service is a Java messaging service within a container.

13. The article of manufacture of claim 8 wherein said awareness arises from a deployment of an application that is to use said proxy and said resource.

14. The article of manufacture of claim 13 further comprising automatically invoking in software a second method call to said messaging service in response to an awareness that said proxy needs to be deactivated, said second method call requesting said service to deactivate said messaging service resource.

15. An article of manufacture including program code which when executed implements a messaging service, said program code comprising:
program code to implement an interface, said interface to receive a first method call from a connector, said first method call formatted to identify a proxy within said connector and to request a messaging service resource to be created, said proxy to accept method calls for said messaging service resource.

16. The article of manufacture of claim 15 wherein said resource is a queue.

17. The article of manufacture of claim 15 wherein said resource is a topic.

18. The article of manufacture of claim 15 wherein said resource is a connection factory.

19. The article of manufacture of claim 15 wherein said interface is to receive a second method call from said connector, said second method call formatted to indicate that a resource is to be deactivated.

20. The article of manufacture of claim 15 wherein said messaging service is a Java messaging service.

* * * * *